US012018813B1

(12) United States Patent
Schaak

(10) Patent No.: US 12,018,813 B1
(45) Date of Patent: Jun. 25, 2024

(54) LAMP SHADE ASSEMBLY AND ASSOCIATED METHOD FOR USING THE SAME

(71) Applicant: Lee Schaak, Dix Hills, NY (US)

(72) Inventor: Lee Schaak, Dix Hills, NY (US)

(73) Assignee: Adesso Inc., New York, NY (US)

( * ) Notice: Subject to any disclaimer, the term of this patent is extended or adjusted under 35 U.S.C. 154(b) by 0 days.

(21) Appl. No.: 18/094,589

(22) Filed: Jan. 9, 2023

(51) Int. Cl.
*F21V 1/06* (2006.01)
*F21V 1/14* (2006.01)

(52) U.S. Cl.
CPC ................ *F21V 1/06* (2013.01); *F21V 1/143* (2013.01)

(58) Field of Classification Search
CPC .................................. F21V 1/06; F21V 1/143
See application file for complete search history.

(56) References Cited

U.S. PATENT DOCUMENTS

D135,496 S 4/1943 Lueders
3,435,205 A 3/1969 Paul
D246,397 S 11/1977 Booty
4,075,684 A 2/1978 Witz
4,275,434 A 6/1981 Borowitz
4,354,222 A 10/1982 Gall
4,685,038 A 8/1987 Huang
4,758,936 A 7/1988 Maxwell
4,987,524 A 1/1991 Miller
6,517,220 B2 2/2003 Wu
6,604,846 B2 8/2003 Strickland
7,121,695 B2 10/2006 Wu
D548,875 S 8/2007 Schieber
8,596,833 B1 12/2013 Cytrynowicz
8,668,367 B2 3/2014 Anderson et al.
8,757,835 B2 6/2014 Chang et al.
D755,438 S 5/2016 Kimmet
9,657,914 B2 5/2017 Anderson et al.
10,094,532 B2 10/2018 Houston
10,641,460 B1 * 5/2020 Chen ....................... F21V 1/143
10,883,697 B1 * 1/2021 Ma ............................ F21V 1/06
11,009,211 B1 * 5/2021 Zhong ....................... F21V 1/06
11,435,055 B1 * 9/2022 Shen ....................... F21V 1/143
11,573,002 B1 * 2/2023 Shen ......................... F21V 1/02
2002/0154509 A1 * 10/2002 Dene ......................... F21V 1/06 362/450
2006/0039155 A1 2/2006 Liu
2007/0263392 A1 * 11/2007 Hsieh ........................ F21V 1/06 362/352
2008/0192486 A1 * 8/2008 Lien .......................... F21V 1/06 362/450
2012/0206925 A1 * 8/2012 Shenk ....................... F21V 1/16 362/351
2012/0320605 A1 * 12/2012 Wu ....................... F21V 17/164 362/351

* cited by examiner

*Primary Examiner* — Zheng Song
(74) *Attorney, Agent, or Firm* — King & Partners, PLC

(57) ABSTRACT

A lamp shade assembly, including: (a) a frame sub-assembly; (b) a shade sub-assembly; and (c) wherein the lamp shade assembly is readily convertible between a low-profile, substantially flat storage/collapsed configuration and a fully articulated use/expanded configuration.

1 Claim, 9 Drawing Sheets

LAMP SHADE ASSEMBLY AND ASSOCIATED METHOD FOR USING THE SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to lamp shade assemblies, and, more particularly, to lamp shade assemblies that are readily convertible between a low-profile, substantially flat storage/collapsed configuration and a fully articulated use/expanded configuration. The lamp shade assemblies of the present invention enable significantly reduced shipping costs while, at the same time, provide the user with a product that is easy to assemble in minutes with little or no instructions. The present invention is further directed to methods of using lamp shade assemblies disclosed herein.

2. Background Art

Lamp shade assemblies and components therefor have been known in the art for years and are the subject of a plurality of patents and publications, including: U.S. Pat. No. 10,094,532 entitled "Multifunctional Lamp Shade Assembly," U.S. Pat. No. 9,657,914 entitled "Collapsible Lamp Shade System," U.S. Pat. No. 8,757,835 entitled "Variable Shaped Lamp Shade of LED Lamp," U.S. Pat. No. 8,668,367 entitled "Interchangeable Lamp Shade System," U.S. Pat. No. 8,596,833 entitled "Interchangeable Lamp Shade Kit, Display System and Method," U.S. Pat. No. 7,121,695 entitled "Structure Rapid Assembly/Disassembly Lamp Shade," U.S. Pat. No. 4,987,524 entitled "Lamp Shade with Improved Optical Efficiency," U.S. Pat. No. 4,758,936 entitled "Lamp Shade Assembly," U.S. Pat. No. 4,685,038 entitled "Foldable Lampshade for a Hanging Lamp," and U.S. Pat. No. 4,075,684 entitled "Foldable Lampshade"—all of which are hereby incorporated herein by reference in their entirety including all references cited therein.

U.S. Pat. No. 10,094,532 appears to disclose an illuminated multifunctional lamp shade assembly that includes a frame, a finial, at least one light, a timer and a battery. The assembly can be used for lighting in emergency circumstances, or in addition to, or instead of, standard lighting under non-emergency circumstances. The assembly can be portable such that it can be used in place on a lamp or removed and be used as an independent portable light source for a variety of applications.

U.S. Pat. No. 9,657,914 appears to disclose a collapsible lamp shade system that allows easy updating of room décor using a collapsible shade wrap. The collapsible shade wrap may include a top attachment mechanism to secure the top edge of the collapsible shade wrap to a top lamp shade fitter and a bottom attachment mechanism to secure the bottom edge of the collapsible shade wrap to a bottom ring. The top and/or bottom attachment mechanisms may wrap around a top and/or bottom ring of a lamp shade fitter. The collapsible shade wrap may include a separating closure mechanism to attach the sides of the collapsible shade wrap together to provide interchangeable lamp shade décor with a tailored look.

U.S. Pat. No. 8,757,835 appears to disclose a variable shaped lamp shade of an LED lamp. The lamp shade is made out of a translucent material matched with an LED lamp strip and a lamp holder and includes at least one strip-shaped optical refraction unit having an external refractive surface, an internal refractive surface corresponding to the external refractive surface, and an assembling structure for matching the lamp holder. The external refractive surface or internal refractive surface is a curved surface without an inflection point and the curved surface has a constant or gradually changing curvature; and a non-curved surface is formed on the other side. The variable shaped lamp overcomes the problems of conventional LED lamp strips having a low illumination and a non-uniform illumination caused by a direct projection or an installation of a conventional lamp shade, and a low light utility caused by an illumination range that is too large.

U.S. Pat. No. 8,668,367 appears to disclose a lamp shade cover that fits snugly over a lamp shade or lamp shade liner to provide interchangeable lamp shade decor with a tailored look. In embodiments, a separating closure mechanism attaches sides of the lamp shade cover together to form a lamp shade form that fits snugly over the supporting lamp shade or lamp shade liner. In embodiments, the separating closure mechanism is a separating zipper sewn into either side of the lamp shade cover. Other embodiments include an interchangeable lamp shade system that comprises a lamp shade liner and one or more lamp shade covers that fit snugly over the lamp shade liner and are removable via the separating closure mechanism of the lamp shade cover.

U.S. Pat. No. 8,596,833 appears to disclose an exemplary interchangeable lamp shade kit that may comprise a lamp base, a spider element and a shade element with at least flat and deployed confirmations. The shade element includes opposing first and second ends with respective securement elements generally formed thereat and adapted to engage one another for releasably retaining the shade element in its cylindrical deployed configuration. A plurality of detent apertures in the shade element are adapted to receive respective detent elements radially distributed about the spider element. An exemplary system and method for displaying lamp shade kits may comprise a display element supportingly presenting a multiplicity of lamp bases, a plurality of spider elements, and an assortment of shade elements. The shade elements may be releasably suspended in their flat configurations in a linear or curved array for convenient review and selection by consumers positioned on a consumer pathway adjacent the display element.

U.S. Pat. No. 7,121,695 appears to disclose an improved structure rapid assembly/disassembly lamp shade that includes a double-layer type lamp shade design in which the outer layer lamp shade rests on a plurality of support rods the length of the lamp shade insertionally coupled to the bottom ring and, furthermore, the support rods are upwardly whorl-folded relative to the axial center of the bottom ring such that the support rod top sections are inwardly against the bottom edge of the outer layer lamp shade top ring. Additionally, a top support frame is disposed at the apex of the inner layer lamp shade and, furthermore, the top support frame provides for light bulb mounting. Among the features, after each of the support rods are coupled to the outer layer lamp shade top ring, insertional offset slots are formed along the bottom edge of the outer layer lamp shade top ring that provides for the engagement of the inner layer lamp shade top support frame to thereby keep the circumferential rim of the inner layer lamp shade top support frame tightly positioned in the insertional offset slot. As such, the present invention achieves assembly and disassembly that is both convenient and rapid. Furthermore, the top and bottom rings as well as the inner and outer layer lamp shades are all collapsible into a flat state to reduce storage and shipping dimensions and thereby effectively reduce shipping costs.

U.S. Pat. No. 4,987,524 appears to disclose a lamp shade in the form of a translucent material in a generally tubular shape disposed about the vertical axis of a light source. The shade has an optical transmittance in the horizontal plane passing through the centroid of the light source, and a greater optical transmittance through the portion of the shade extending below the horizontal plane. A preferred embodiment controls the optical transmittance providing variable reflectance on the inner surface of the shade, and includes a generally reflective upper end closure having a means for supporting the shade, and a generally reflective convex cone below the light source.

U.S. Pat. No. 4,758,936 appears to disclose a lamp shade assembly that is aesthetically pleasing, easy to assemble and one which may be utilized in a variety of orientations to provide either direct or indirect lighting. The assembly has a shade body member having a generally conical configuration which may be attached to a lamp socket. A lamp shade, which may be made of a flexible, expandable material is initially formed in a cylindrical configuration wherein the diameter is less than the maximum diameter of the conical body member, and one end of the shade is placed into the body member. A retaining member is inserted into the interior of the lamp shade so as to urge a portion of the outer surface of the lamp shade material into contact with an inner surface of the body member, thereby forming the lamp shade into a generally conical configuration. A locking collar, threadingly engaged with a lamp socket, holds the retaining member in place against the inner surface of the lamp shade.

U.S. Pat. No. 4,685,038 appears to disclose a hanging lamp that can be folded in a compact size so as to ease packaging and shipment. The hanging lamp includes a foldable lampshade and a switch housing having a plurality of bendable lamp tube attached thereto. A plurality of ribs of the lampshade extend downwardly and outwardly from a top centerpiece forming a dome-shaped frame structure. Each rib includes an upper rib segment and a lower rib segment connected with each other by a pivot pin. A spring is disposed around the pivot pin and biases the lower rib segment away from the upper rib segment in a transverse direction so as to ease folding up the lower rib segment against the upper rib segment. The bendable lamp tube can also be bent inwardly so that the hanging lamp occupies little space in shipment.

U.S. Pat. No. 4,075,684 appears to disclose a lampshade that includes flexible material which can be unrolled to form a relatively large cylindrical shade. Upper and lower hoops are formed of flexible strip material by unspiralling the strip material and connecting its ends together thus holding the upper and lower interior portions of the shade in circular positions. A spider assembly is made up of three elongated flat arms pivoted together and arranged to be scissored apart to radially extend at 120°. The ends of these arms cradle portions of the upper hoop on the interior of the shade to provide a central mount for securing the shade to a lamp.

While the above-identified patents and publications do appear to disclose various lamp shade assemblies, their configurations remain non-desirous and/or problematic inasmuch as, among other things, none of the above-identified lamp shade assemblies are readily convertible between a low-profile, substantially flat storage/collapsed configuration and a fully articulated use/expanded configuration as disclosed herein. Moreover, the above-identified references appear do not appear to enable significantly reduced shipping costs while, at the same time, provide the user with a product that is easy to assemble in minutes with little or no instructions.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a lamp shade assembly, comprising, consisting essentially of and/or consisting of: a lamp shade assembly, comprising: (a) a frame sub-assembly; (b) a shade sub-assembly; and (c) wherein the lamp shade assembly is readily convertible between a low-profile, substantially flat storage/collapsed configuration and a fully articulated use/expanded configuration.

In a preferred embodiment of the present invention, the lamp shade assembly significantly reduces shipping costs while, at the same time, provides the user with a product that is easy to assemble in minutes with little or no instructions.

In another preferred embodiment of the present invention, the frame sub-assembly comprises an upper frame member, wherein the upper frame member includes a pair of rods that are joined together via one or more connectors.

In yet another preferred embodiment of the present invention, the frame sub-assembly comprises an upper frame member, wherein the upper frame member includes a pair of semi-circular rods that are joined together via a pair of connectors to form an upper circular frame member. In this embodiment, the connectors preferably comprise a pair of friction fit rod joiners.

In one preferred embodiment of the present invention, the frame sub-assembly comprises a lower frame member, wherein the lower frame member includes a pair of rods that are joined together via one or more connectors.

In a preferred implementation of the present invention, the frame sub-assembly comprises a lower frame member, wherein the lower frame member includes a pair of semi-circular rods that are joined together via three connectors to form a lower circular frame member having three supports spaced apart approximately 120 degrees that are connected to a central circular member that is connectable to a lamp. In this embodiment, the central circular member is preferably positioned above the lower circular frame member and the three connectors preferably comprise three friction fit rod joiners.

In another preferred implementation of the present invention, the shade sub-assembly includes a shade having a top, a bottom, an inner surface, and an outer surface.

In yet another preferred implementation of the present invention, the inner surface of the shade comprises a plurality of slots proximate the top and bottom for retaining a plurality of retaining clips.

In one preferred implementation of the present invention, a plurality of retaining clips (e.g., C-shaped, U-shaped, etcetera) are positioned within the plurality of slots proximate the top and bottom of the shade.

The present invention is also directed to a lamp shade assembly, comprising, consisting essentially of and/or consisting of: (a) a frame sub-assembly; (b) a shade sub-assembly; (c) wherein the frame sub-assembly comprises an upper frame member, wherein the upper frame member includes a pair of semi-circular rods that are joined together via a pair of connectors to form an upper circular frame member; (d) wherein the frame sub-assembly comprises a lower frame member, wherein the lower frame member includes a pair of semi-circular rods that are joined together via three connectors to form a lower circular frame member having three supports spaced apart approximately 120 degrees that are connected to a central circular member that is connectable to a lamp; (e) wherein the central circular member is positioned above the lower circular frame member; (f) wherein the shade sub-assembly includes a shade having a top, a bottom, an inner surface, and an outer surface; (g) wherein a plurality of retaining clips are positioned within a plurality of slots proximate the top of the shade; and (h) wherein a plurality of retaining clips are positioned within the plurality of slots proximate the bottom of the shade.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
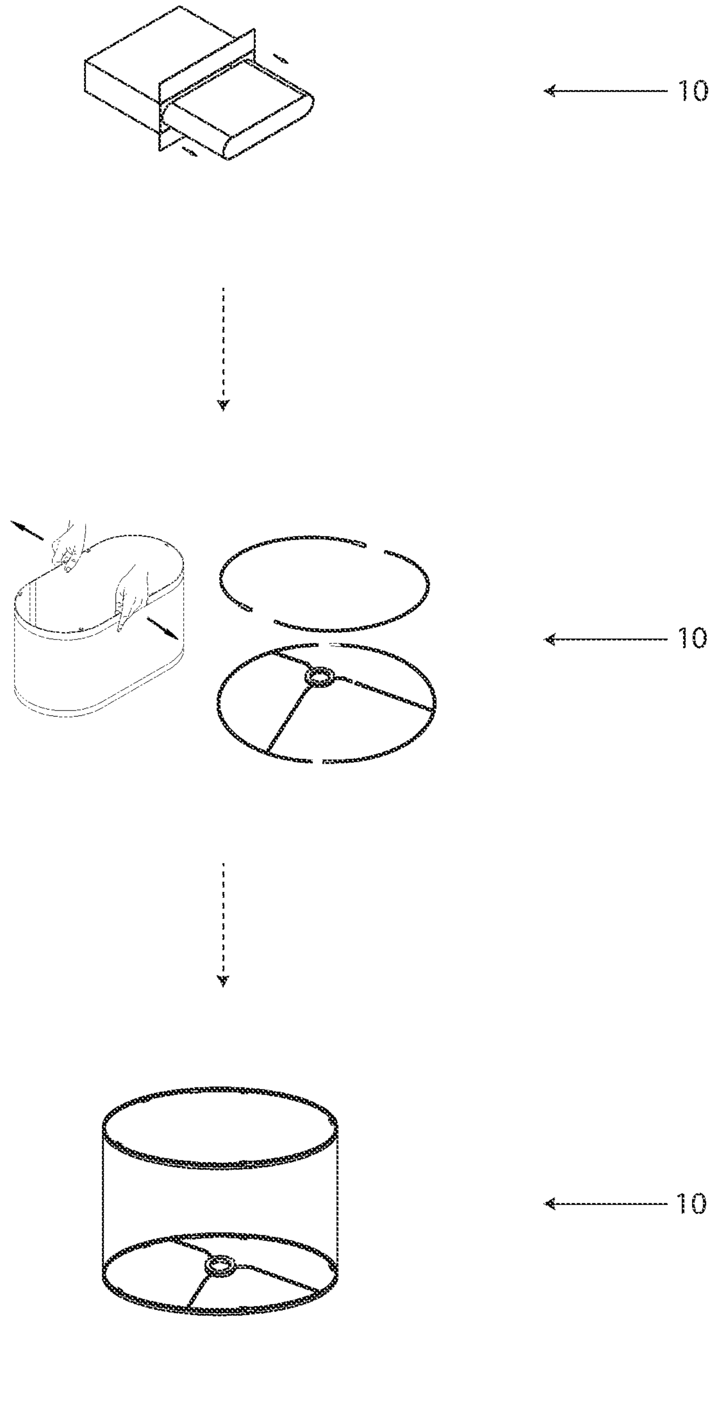
Figure 2:
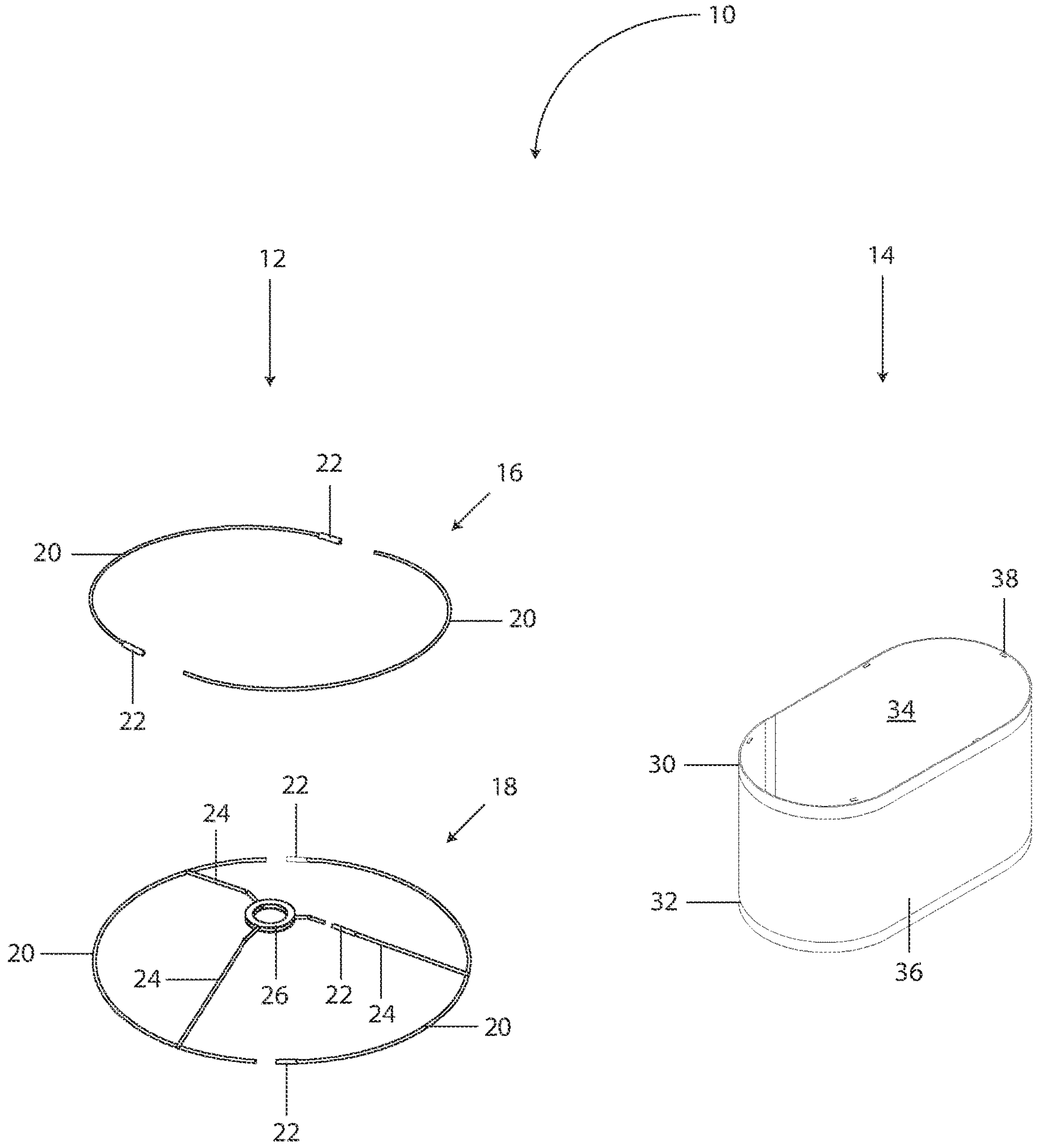
Figure 3:
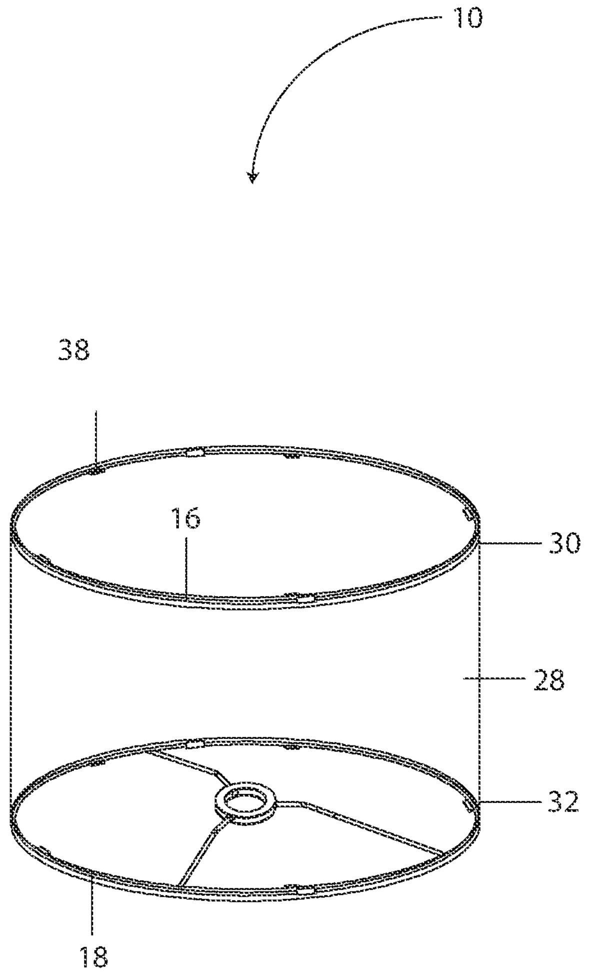
Figure 4:
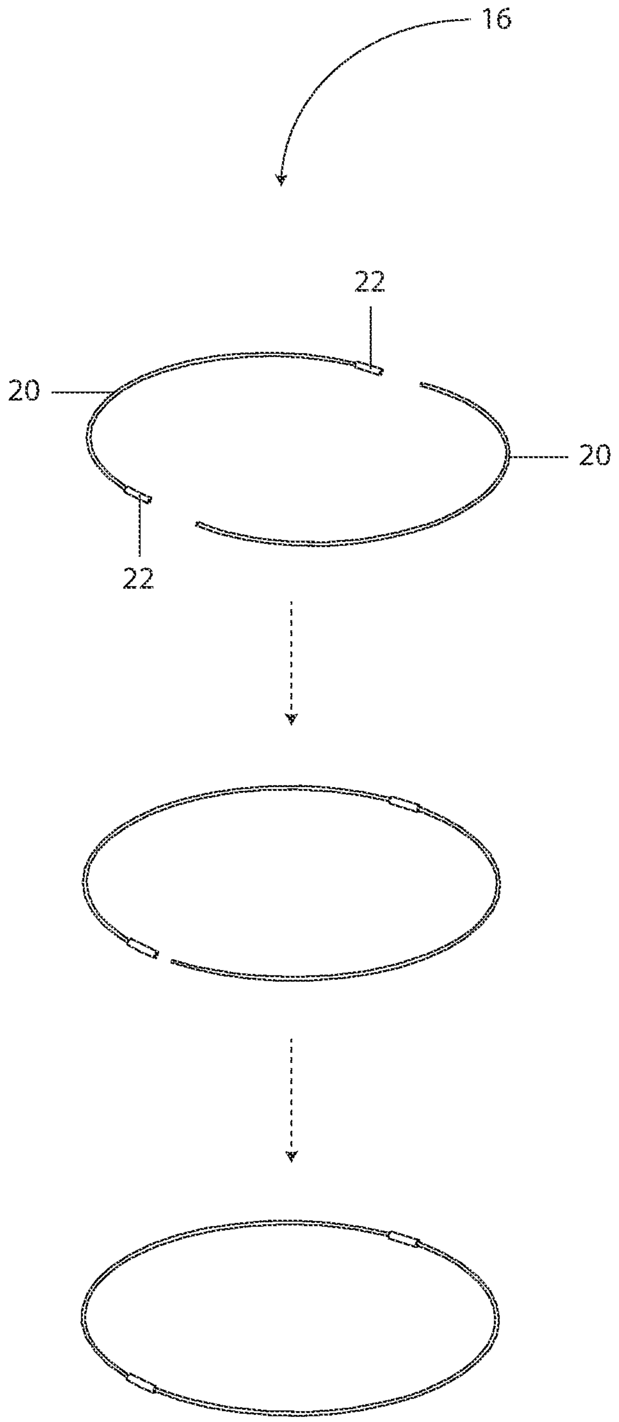
Figure 5:
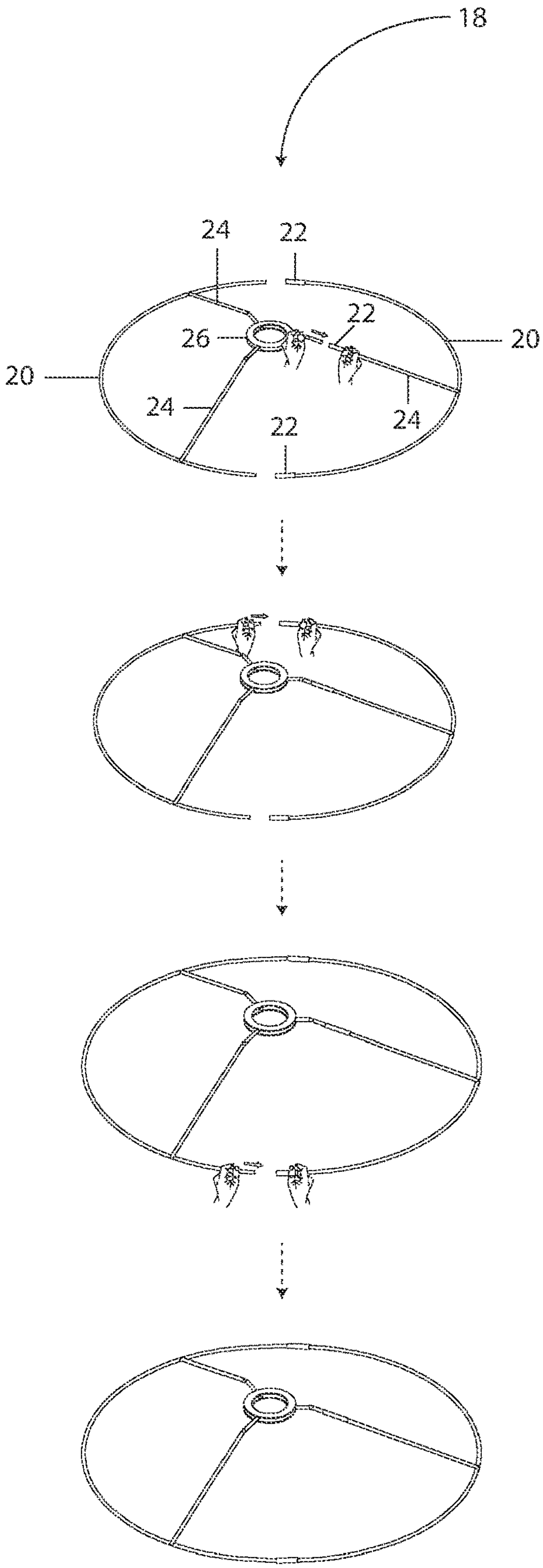
Figure 6:
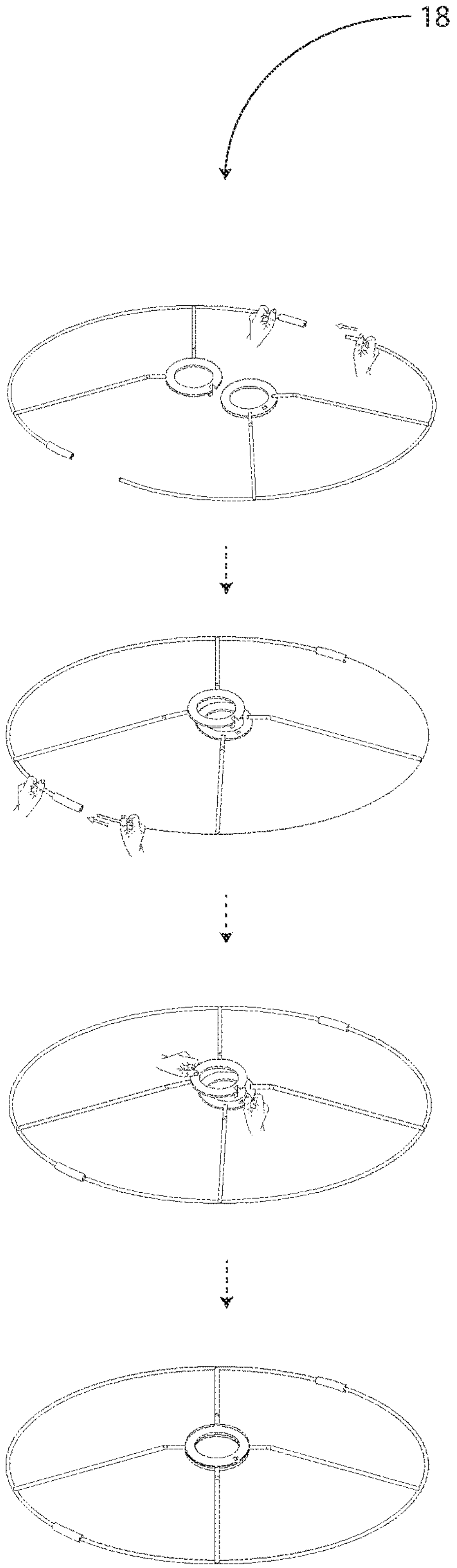
Figure 7:
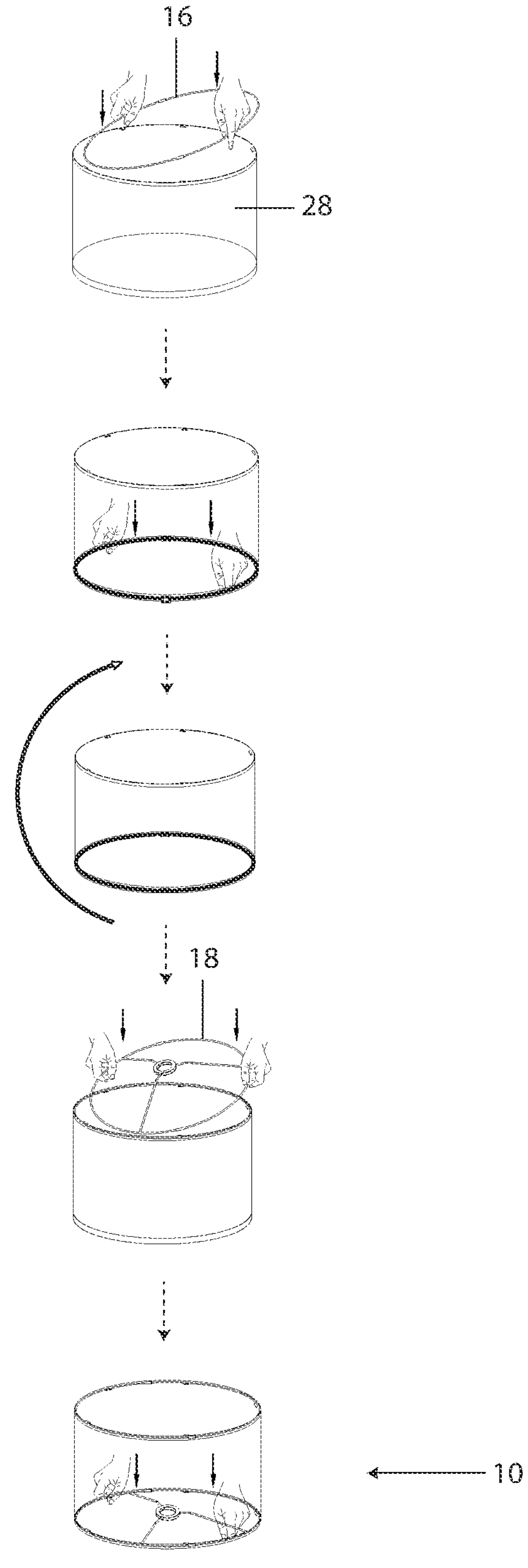
Figure 8:
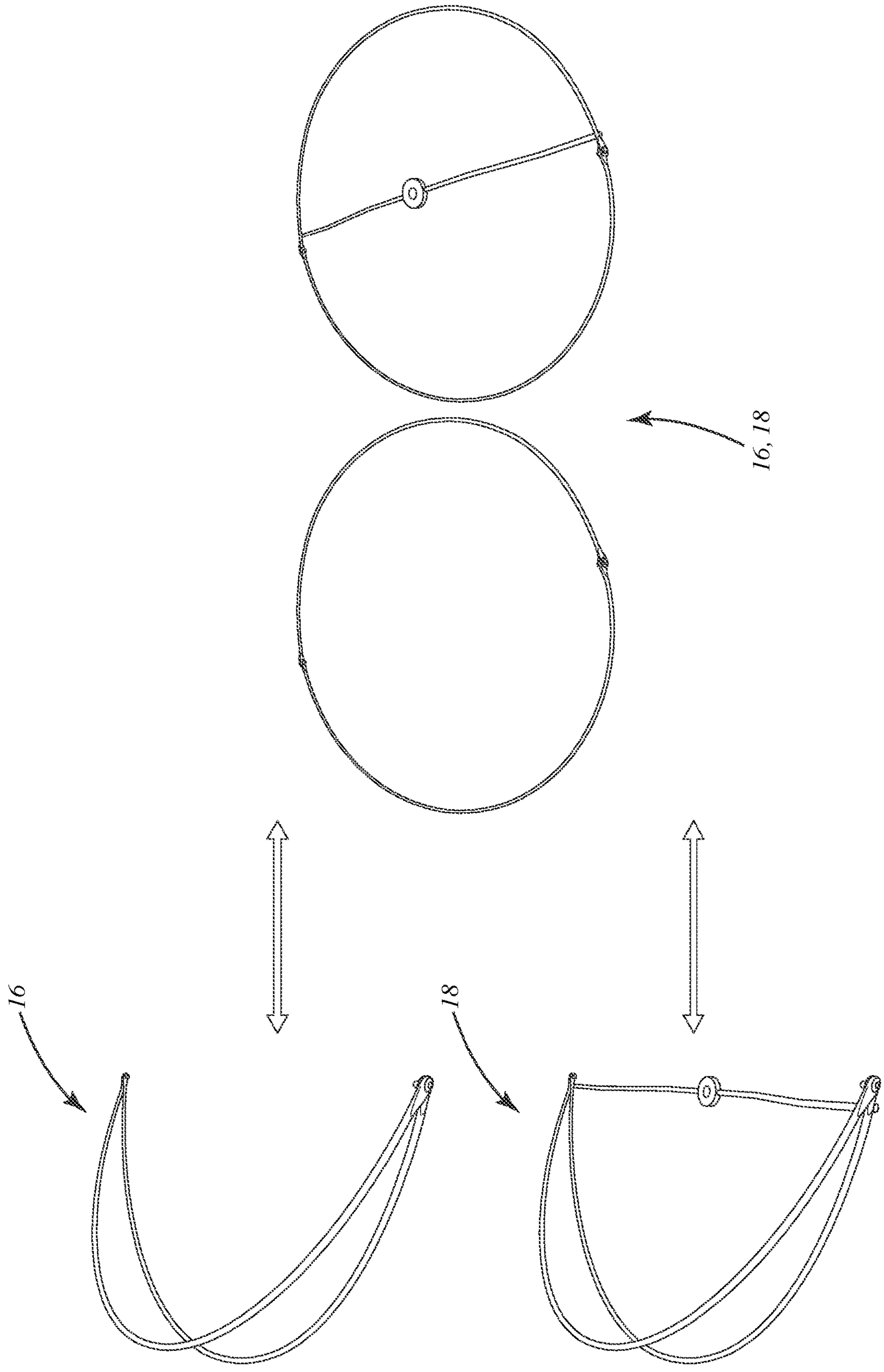
Figure 9:
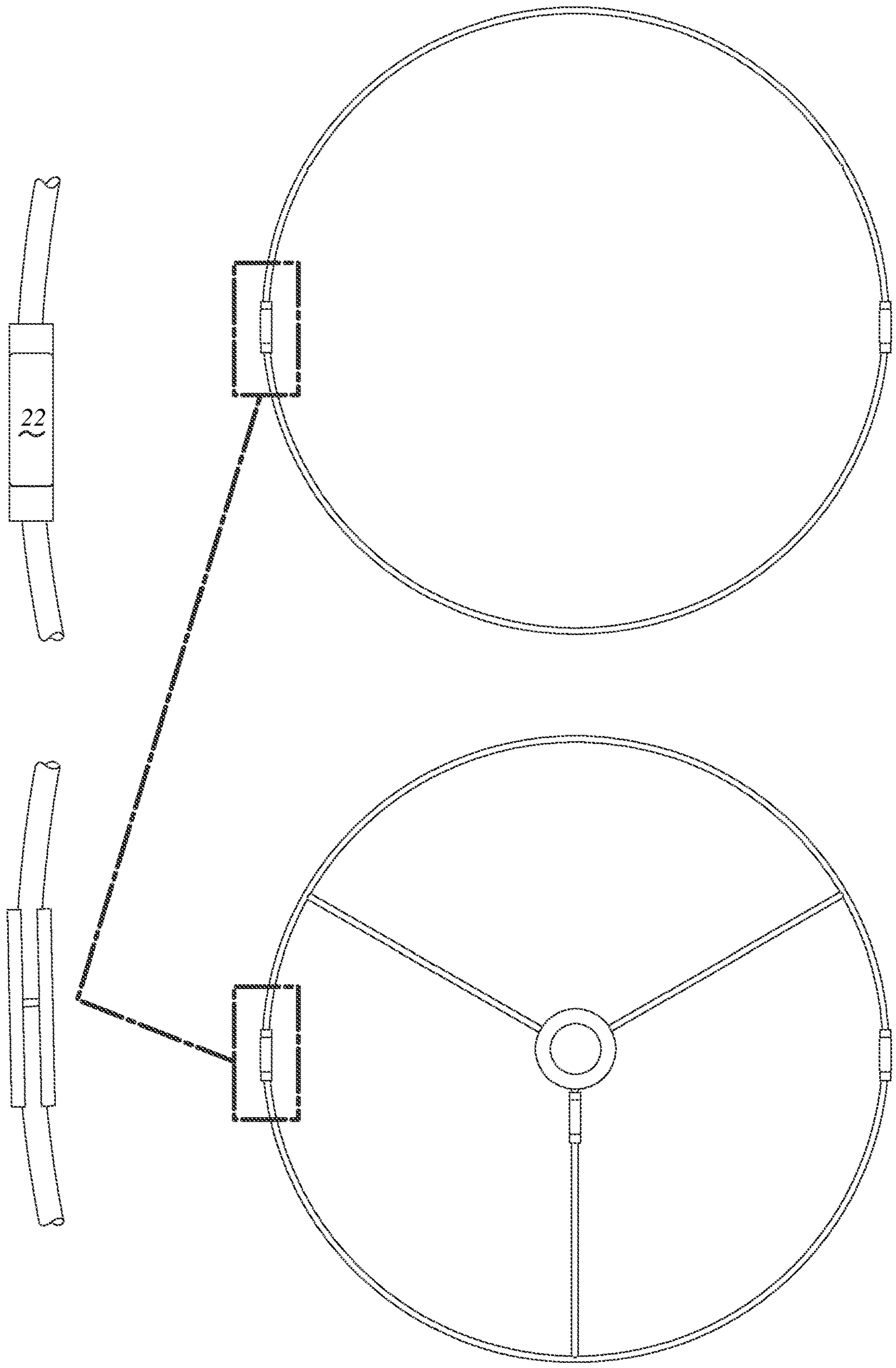

The invention will now be described with reference to the drawings wherein:

FIG. 1 of the drawings is a perspective view of a lamp shade assembly of the present invention being converted between a low-profile, substantially flat storage/collapsed configuration and a fully articulated use/expanded configuration;

FIG. 2 of the drawings is a perspective view of the lamp shade assembly of FIG. 1 (unassembled);

FIG. 3 of the drawings is a perspective view of the lamp shade assembly of FIG. 1 (assembled);

FIG. 4 of the drawings is a perspective view of an upper frame member of the lamp shade assembly of FIG. 1 (unassembled to assembled);

FIG. 5 of the drawings is a perspective view of a lower frame member of the lamp shade assembly of FIG. 1 (unassembled to assembled);

FIG. 6 of the drawings is a perspective view of an alternative embodiment of a lower frame member of the lamp shade assembly of FIG. 1 (unassembled to assembled);

FIG. 7 of the drawings is a perspective view an assembly progression of the lamp shade assembly of FIG. 1;

FIG. 8 of the drawings are perspective views of foldable upper and lower frame members of the lamp shade assembly (folded to unfolded); and FIG. 9 of the drawings are perspective views showing alternative plastic connectors for use in accordance with the present invention.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

In accordance with the present invention, and as is best shown in FIG. 1, lamp shade assembly 10 is readily convertible between a low-profile, substantially flat storage/transportation/collapsed configuration and a fully articulated use/expanded configuration. Lamp shade assembly 10 enables significantly reduced shipping costs while, at the same time, provides the user with a lamp shade that is easy to assemble in minutes with little or no instruction.

Referring now to FIGS. 2 and 3, lamp shade assembly 10 is shown as generally comprising frame sub-assembly 12 and shade sub-assembly 14.

As is best shown in FIG. 2, frame sub-assembly 12 comprises upper frame member 16 and lower frame member 18.

As is best shown in FIGS. 2 and 4, upper frame member 16 includes rods 20 that are joined together via connectors 22. Preferably, upper frame member 16 includes a pair of semi-circular rods that are joined together via a pair of friction fit rod joiners to form an upper circular frame member.

Upper frame member 16 is preferably fabricated from a material selected from the group consisting of a metal, a metal alloy, a natural resin, a synthetic resin, a plastic, a composite, fiberglass and/or wood.

As is best shown in FIGS. 2 and 5, lower frame member 18 includes rods 20 that are joined together via connectors 22. Preferably, lower frame member 18 includes a pair of semi-circular rods that are joined together via three friction fit rod joiners to form a lower circular frame member having three supports/spokes 24 spaced apart approximately (+/−10 degrees) 120 degrees that are connected to central circular member 26 that is connectable to a lamp. In particular, central circular member 26 is placed on the lamp socket (not shown) and a socket ring (not shown) is screwed down to secure the lamp shade assembly. Central circular member 26 is preferably positioned above the lower circular frame member.

An alternative embodiment of lower frame member 18 is shown in FIG. 6.

Lower frame member 18 is preferably fabricated from a material selected from the group consisting of a metal, a metal alloy, a natural resin, a synthetic resin, a plastic, a composite, fiberglass and/or wood.

Referring now to FIGS. 2 and 3, shade sub-assembly 14 includes shade 28 having top 30, bottom 32, inner surface 34, and outer surface 36. Inner surface 34 of shade 28 preferably comprises a plurality (e.g., 2, 3, 4, 5, 6, 7, 8, 9, 10, etcetera) of slots proximate top 30 and bottom 32 for retaining a plurality of retaining clips 38 (e.g., C-shaped, U-shaped, etcetera). Retaining clips 38 may be secured in place via a traditional adhesive.

In accordance with the present invention shade 28 may be transparent, translucent, non-transparent, and/or non-translucent.

Shade 28 is preferably fabricated from a material selected from the group consisting of a fabric, a metal, a metal alloy, a natural resin, a synthetic resin, a plastic, a composite, fiberglass and/or wood.

As is best shown in FIG. 7, lamp shade assembly 10 is readily assembled by securing assembled upper frame member to the lamp shade via the snap-fit connectors. Next, the assembled lower frame member is secured to the lamp shade via the snap-fit connectors. The lamp shade assembly is ready for securement to an associated lamp.

As is best shown in FIG. 8, lamp shade assembly 10 may utilize foldable upper and lower frame members 16 and 18, respectively. Such an implementation readily enables the frame members to be converted between a folded (e.g., storage, flat, substantially flat) configuration and an unfolded (e.g., use, deployed) configuration. The frame members are preferably multi-piece members that are connected via a pin, rivet, etcetera through apertures in and/or associated with each one of the frame members.

Referring now to FIG. 9 of the drawings, and in one embodiment of the present invention, the lamp shade assemblies of the present invention may include substantially-U shaped and/or U-shaped plastic connectors 22. The plastic connectors disclosed herein are preferred over metal connectors because metal connectors can leave gaps between the frame members and/or scratch the frame members themselves during assembly and installation. The plastic connectors of the present invention also provide a degree of flexibility which help facilitate easy and rapid assembly relative to metal connectors.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms “comprising,” “including,” “containing,” etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase “consisting essentially of” will be understood to include those elements specifically recited and those additional elements that do not materially affect the basic and novel characteristics of the claimed technology. The phrase “consisting of” excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as “up to,” “at least,” “greater than,” “less than,” and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by letters patent of the United States is:

1. A lamp shade assembly, consisting of:

a frame sub-assembly, wherein the frame sub-assembly consists of:

an upper frame member, wherein the upper frame member consists of a first semi-circular rod and a second semi-circular rod, wherein the first and second semi-circular rods of the upper frame member are secured together by a first connector and a second connector, wherein the first and second connectors of the upper frame member are plastic, non-fully enclosed, and substantially U-shaped, to, in turn, facilitate a snap fit connection between the first and second semi-circular rods of the upper frame member; and a lower frame member, wherein the lower frame member consists of a first semi-circular rod having a first support spoke secured thereto and a second semi-circular rod having a second support spoke and a third support spoke secured thereto, wherein a central circular member is secured to the second and third support spokes of the second semi-circular rod of the lower frame member, wherein the first and second semi-circular rods of the lower frame member are secured together by a first connector, a second connector, and a third connector, wherein the first, second, and third connectors of the lower frame member are plastic, non-fully enclosed, and substantially U-shaped, to, in turn, facilitate a snap fit connection between the first and second semi-circular rods of the lower frame member, and wherein the third connector is positioned between the first support spoke and the central circular member; and a shade sub-assembly, wherein the lamp shade assembly is readily convertible between a low-profile, substantially flat storage/collapsed configuration and a fully articulated use/expanded configuration.

* * * * *